H. D. EILERS.
AUTOMOBILE LOCK.
APPLICATION FILED AUG. 10, 1917.

1,377,819. Patented May 10, 1921.

Inventor
Herman D. Eilers
By Victor J. Evans
Attorney

Witness
E. P. Ruppert
E. M. Springer

UNITED STATES PATENT OFFICE.

HERMAN D. EILERS, OF IRETON, IOWA.

AUTOMOBILE-LOCK.

1,377,819. Specification of Letters Patent. Patented May 10, 1921.

Application filed August 10, 1917. Serial No. 185,569.

*To all whom it may concern:*

Be it known that I, HERMAN D. EILERS, a citizen of the United States, residing at Ireton, in the county of Sioux and State of Iowa, have invented new and useful Improvements in Automobile-Locks, of which the following is a specification.

This invention relates to an automobile lock and more particularly to a lock for securing the controlling means carried by the steering pillar, and the object is to provide a device of simple construction which may be secured by a pad lock of usual design and arranged to prevent the operation of the sparking lever and the throttle lever.

A further object is to provide a retaining bar having an offset portion thereon and a loop at one end, said loop being passed over the end of the throttle lever and the offset portion permitting it to pass behind the spark controlling lever of a well known type of car, the bar being then secured to the spark lever by means of a pad lock.

With the foregoing and other objects in view, the invention consists in the novel construction, combination and arrangement of elements hereinafter described and claimed.

Figure 1:
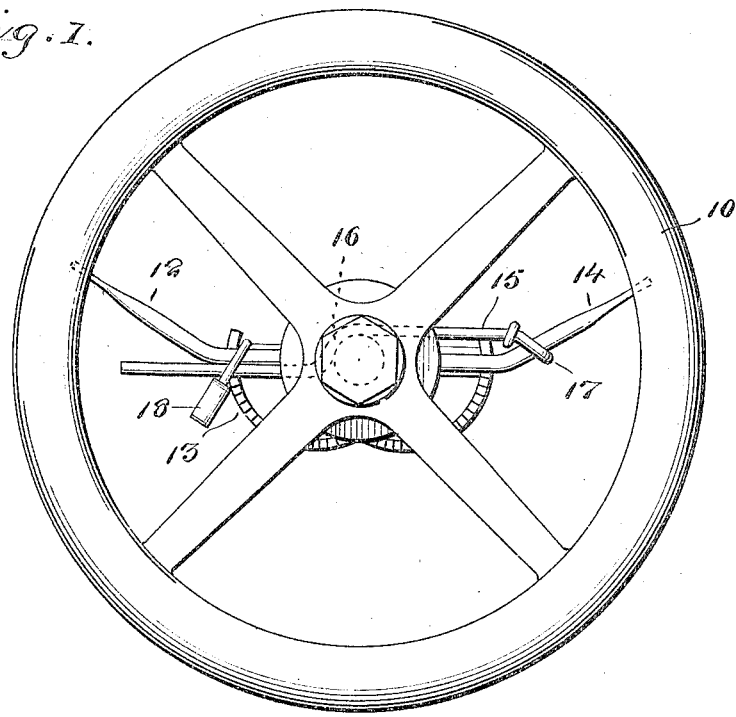
Figure 1 is a top plan view of the steering means with my improvements applied thereto.
Figure 2:
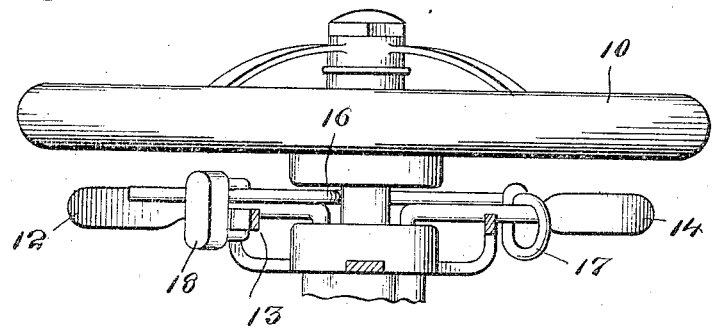
Fig. 2 is a view in side elevation.
Figure 3:
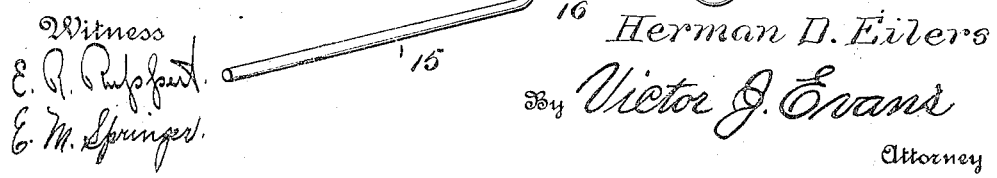
Fig. 3 is a detail view of the securing bar.

The steering wheel is designated 10, the spark controlling lever is shown at 12 and the throttle lever at 14. In order to lock these levers and prevent their operation by unauthorized individuals, I provide a simple securing device comprising a bar formed of heavy wire or the like and designated 15, this bar being provided with an offset at 16 and a loop shown at 17. The loop is designed to pass over the throttle lever, and the offset portion permits the opposite end of the bar to pass behind the spark controlling lever. The device is secured in position by passing the hasp of a pad lock 18 over the lever 12, bracket 13, and the adjacent end of bar 15. In view of the connection with the bracket, illustrated in the drawings, lever 12 is locked, even if bar 15 is filed off.

The device when detached may be carried in any suitable position, as upon supporting devices secured to the dash board of the vehicle. Slight modification in the form of the device permits of it being employed on different types of cars.

What is claimed is:

The combination with the controlling levers carried by the steering column of an automobile, and a segmental bracket coöperating therewith, of a bar of uniform cross section throughout having one end bent into the form of a loop, the extreme end of the loop being coiled around the bar, said bar being offset intermediate of its ends and extending in a direction parallel with one of the controlling levers, the loop portion passing around the other of said levers, and a lock including a hasp passing around one end of the bar, one lever, and a portion of the bracket.

In testimony whereof I affix my signature.

HERMAN D. EILERS.